United States Patent
Cai

(10) Patent No.: US 11,223,276 B1
(45) Date of Patent: Jan. 11, 2022

(54) ADAPTIVE CONSTANT ON TIME CONVERTER AND THE METHOD THEREOF

(71) Applicant: Monolithic Power Systems, Inc., San Jose, CA (US)

(72) Inventor: Wen Cai, Santa Clara, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 0 days.

(21) Appl. No.: 17/085,969

(22) Filed: Oct. 30, 2020

(51) Int. Cl.
*H02M 3/04* (2006.01)
*H02M 1/00* (2006.01)

(52) U.S. Cl.
CPC ............... *H02M 3/04* (2013.01); *H02M 1/00* (2013.01); *H02M 1/0012* (2021.05)

(58) Field of Classification Search
CPC .......... H02M 3/04; H02M 3/10; H02M 3/145; H02M 3/155; H02M 1/00; H02M 1/0012
See application file for complete search history.

(56) References Cited

U.S. PATENT DOCUMENTS

| | | | |
|---|---|---|---|
| 8,773,090 B2 | 7/2014 | Ouyang et al. | |
| 8,872,501 B2 | 10/2014 | Dong et al. | |
| 8,912,776 B2 | 12/2014 | Qian et al. | |
| 9,041,373 B2 | 5/2015 | Jiang et al. | |
| 9,041,377 B2 | 5/2015 | Wang et al. | |
| 9,270,176 B1 | 1/2016 | Nguyen et al. | |
| 9,356,510 B2 | 5/2016 | Jiang et al. | |
| 9,455,625 B2 | 9/2016 | Zhang | |
| 9,467,045 B2 | 10/2016 | Fogg et al. | |
| 9,559,586 B2 | 1/2017 | Ouyang | |
| 9,647,552 B2 | 5/2017 | Li | |
| 9,716,432 B2 | 7/2017 | Ouyang | |
| 9,923,463 B2 | 3/2018 | Yuan et al. | |
| 10,020,734 B2 | 7/2018 | Zhong | |
| 10,075,078 B2 | 9/2018 | Li | |
| 10,284,086 B2 | 5/2019 | Li | |
| 2002/0145409 A1* | 10/2002 | Umminger | H02M 3/1584 323/282 |
| 2004/0008016 A1* | 1/2004 | Sutardja | H02M 3/157 323/283 |
| 2008/0252274 A1* | 10/2008 | Schindler | H02M 3/1588 323/282 |
| 2016/0036326 A1* | 2/2016 | Sreenivas | H02M 3/158 323/271 |
| 2018/0048232 A1* | 2/2018 | Adell | H02M 3/1563 |

* cited by examiner

*Primary Examiner* — Adolf D Berhane
(74) *Attorney, Agent, or Firm* — Perkins Coie LLP

(57) ABSTRACT

A voltage converter with a high side power switch, having: an off control circuit, having a first input terminal configured to receive an input voltage, a second input terminal configured to receive an output voltage, a third input terminal configured to receive a current representing signal indicative of a current flowing through the high side power switch, a fourth input terminal configured to receive an on-set signal in response to an on operation of the high side power switch, and an output terminal configured to provide an off control signal to indicate an end of an on time period of the high side power switch; wherein the on time period of the high side power switch is regulated by the input voltage, the output voltage and the current representing signal.

20 Claims, 4 Drawing Sheets

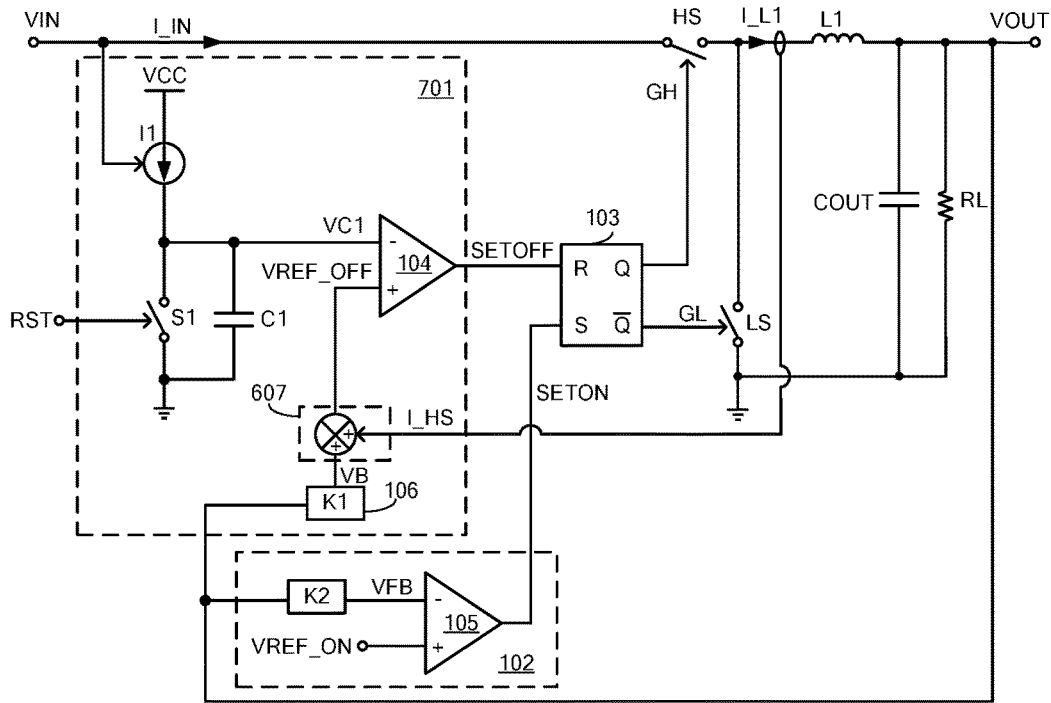

| providing an on control signal to turn on the high side power switch, wherein the on control signal turns on the high side power switch when a feedback voltage indicative of an output voltage of the voltage converter decreases to an on reference signal; | 801 |

| providing an off control signal to turn off the high side power switch, wherein the off control signal turns off the high side power switch when an on time period of the high side power switch ends, and wherein the on time period is regulated by an input voltage of the voltage converter, the output voltage and a current representing signal indicative of a current flowing through the high side power switch. | 802 |

FIG. 8

ADAPTIVE CONSTANT ON TIME CONVERTER AND THE METHOD THEREOF

FIELD

The present invention relates generally to electronic circuits, and more particularly but not exclusively to voltage converters with constant-on-time control and the method thereof.

BACKGROUND

There are varieties of control techniques adopted by voltage converters, e.g., voltage mode, current mode, hysteretic mode and constant-on-time mode. Both voltage mode control and current mode control have an amplifier in the control loop and require loop compensation for achieving stable operation at the wide range of input voltage range, which results slow transient response. Constant-on-time control, on the other hand, uses the output voltage ripple as a PWM ramp signal to compare with a reference voltage to regulate the output voltage and has no amplifier in the control loop. Thus, constant-on-time control requires no loop compensation, and has fast transient response, which makes constant-on-time control a popular choice for voltage converters.

The traditional constant-on-time control keeps the on time of the power stage constant, thus the switching frequency of the traditional constant-on-time controlled voltage converter is varying. To make the switching frequency of the constant-on-time controlled voltage converter constant, input voltage and output voltage of the voltage converter are sensed to adjust the on time of the power stage of the voltage converter. However, the relatively constant switching frequency makes low efficiency during heavy load condition. Also, the relatively constant on time results in limited inductor current ramp-up speed and ramp-down speed, which further limits the load transient of the voltage converter.

SUMMARY

It is an object of the present invention to provide a constant-on-time control method with improved heavy load efficiency, fast load transient and enhanced stability.

In accomplishing the above and other objects, there has been provided, in accordance with an embodiment of the present invention, a voltage converter having a high side power switch, comprising: an off control circuit, having a first input terminal configured to receive an input voltage, a second input terminal configured to receive an output voltage, a third input terminal configured to receive a current representing signal indicative of a current flowing through the high side power switch, a fourth input terminal configured to receive an on-set signal corresponding to an on operation of the high side power switch, and an output terminal configured to provide an off control signal to indicate an end of an on time period of the high side power switch; wherein the on time period of the high side power switch is regulated by the input voltage, the output voltage and the current representing signal.

In accomplishing the above and other objects, there has been provided, in accordance with an embodiment of the present invention, a voltage converter comprising: a high side power switch; a low side power switch coupled to the high side power switch, wherein the high side power switch and the low side power switch are turned on and off alternately to convert an input voltage to an output voltage; and an off control circuit, having a first input terminal configured to receive the input voltage, a second input terminal configured to receive the output voltage, a third input terminal configured to receive a current representing signal indicative of a current flowing through the high side power switch, a fourth input terminal configured to receive an on-set signal corresponding to an on operation of the high side power switch, and an output terminal configured to provide an off control signal to indicate an end of an on time period of the high side power switch; wherein the on time period of the high side power switch is regulated by the input voltage, the output voltage and the current representing signal.

In accomplishing the above and other objects, there has been provided, in accordance with an embodiment of the present invention, a control method for a voltage converter having a high side power switch, comprising: providing an on control signal to turn on the high side power switch, wherein the on control signal turns on the high side power switch when a feedback voltage indicative of the output voltage decreases to an on reference signal; and providing an off control signal to turn off the high side power switch, wherein the off control signal turns off the high side power switch when an on time period of the high side power switch ends, and wherein the on time period is regulated by the input voltage, the output voltage and a current representing signal indicative of a current flowing through the high side power switch.

The presented invention introduces an input current received by the voltage converter or an inductor current to an on-time generator of a constant-on-time controlled voltage converter to adjust the switching frequency during heavy load condition and light load condition, which highly improves the efficiency, the load transient performance and the stability of the voltage converter.

BRIEF DESCRIPTION OF THE DRAWINGS

FIG. 7 schematically shows a voltage converter 70 in accordance with an embodiment of the present invention.

FIG. 8 shows a flowchart of a control method 80 of a constant-on-time controlled voltage converter in accordance with an embodiment of the present invention.

The use of the same reference label in different drawings indicates the same or like components.

DETAILED DESCRIPTION

In the present invention, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
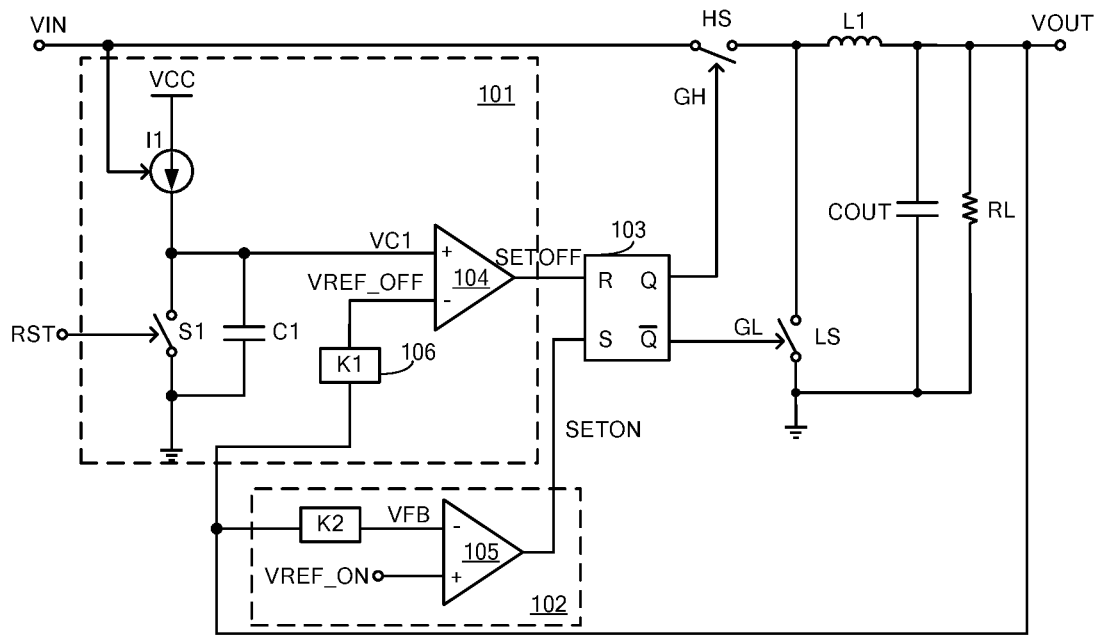
FIG. 1 shows a prior art constant-on-time controlled voltage converter 10.

FIG. 1 shows a prior art constant-on-time controlled voltage converter 10. As shown in FIG. 1, the voltage converter 10 comprises a high side power switch HS, a low side power switch LS, an inductor L1 and an output capacitor COUT coupled in a BUCK topology. The high side power switch HS and the low side power switch LS are coupled in series between an input voltage VIN and a ground reference GND, and are turned on and off alternately to convert the input voltage VIN to an output voltage VOUT provided to a load represented by a resistor RL in FIG. 1. The voltage converter 10 further comprises: an off control circuit 101 configured to receive the input voltage VIN, the output voltage VOUT, and an on-set signal RST corresponding to an on operation of the high side power switch HS, and to provide an off control signal SETOFF to indicate an end of an on time period Ton of the high side power switch HS; an on control circuit 102 configured to receive a feedback signal VFB indicative of the output voltage VOUT and an on reference signal VREF_ON, and to provide an on control signal SETON to indicate a start of the on time period Ton of the high side power switch HS; and a logic circuit 103, configured to receive the off control signal SETOFF, and the on control signal SETON, and to provide a high side switching signal GH to control the high side power switch HS and a low side switching signal GL to control the low side power switch LS, wherein the high side power switch HS and the low side power switch LS have opposite phases, and the high side power switch HS and the low side power switch LS are turned on and off alternately.

In FIG. 1, the on control circuit 102 comprises a comparator 105 configured to provide the on control signal SETON based on the feedback voltage VFB and the on reference signal VREF_ON. The feedback voltage VFB has a relationship VFB=K2*VOUT, with the output voltage VOUT, wherein K2 is a scale factor between VFB and VOUT. The off control circuit 101 comprises a first current source I1, a capacitor C1, a switch S1 and a comparator 104 coupled as shown in FIG. 1. When the feedback voltage VFB decreases to the on reference signal VREF_ON, the on control signal SETON turns on the high side power switch HS by the logic circuit 103, and the low side power switch LS is turned off accordingly. The on-set signal RST has a waveform synchronous with the operation of the high side power switch HS. When the high side power switch HS is turned on, the on-set signal RST turns off the switch S1. Then the capacitor C1 is charged by the first current source I1, which is controlled by the input voltage VIN. When the high side power switch HS is turned off, the on-set signal RST turns on the switch S1. Then the capacitor C1 is discharged. During the charging process, the voltage VC1 across the capacitor C1 increases. When the voltage VC1 increases to an off reference signal VREF_OFF, the off control signal SETOFF flips, and turns off the high side power switch HS by the logic circuit 103.

In FIG. 1, the first current source I1 is controlled by the input voltage VIN, which means the current charging the capacitor C1 is related to the input voltage VIN. The off reference signal VREF_OFF has a relationship VREF_OFF=K1*VOUT, with the output voltage VOUT, wherein K1 is a scale factor between VREF_OFF and VOUT. In the example of FIG. 1, the on time period Ton of the high side power switch HS would be: Ton=K1*C1*VOUT/(K3*VIN), wherein K3 is a scale factor between VIN and I1, i.e., I1=K3*VIN.

In the prior art constant-on-time controlled voltage regulator 10, the on time period Ton of the high side power switch HS is adapted by the input voltage VIN and the output voltage VOUT to keep a switching frequency of the voltage converter relatively constant.

However, in the condition that the input voltage VIN and the output voltage VOUT are fixed, the on time period Ton is fixed, no matter what the load condition is. In that case, the load transient is slow. Meanwhile, the off time period Toff of the high side power switch HS is shortened during heavy load when the on time period Ton is fixed, which means a switching frequency of the voltage converter 10 is high during heavy load. As a result, a switching loss of the voltage converter 10 is high.

Figure 2:
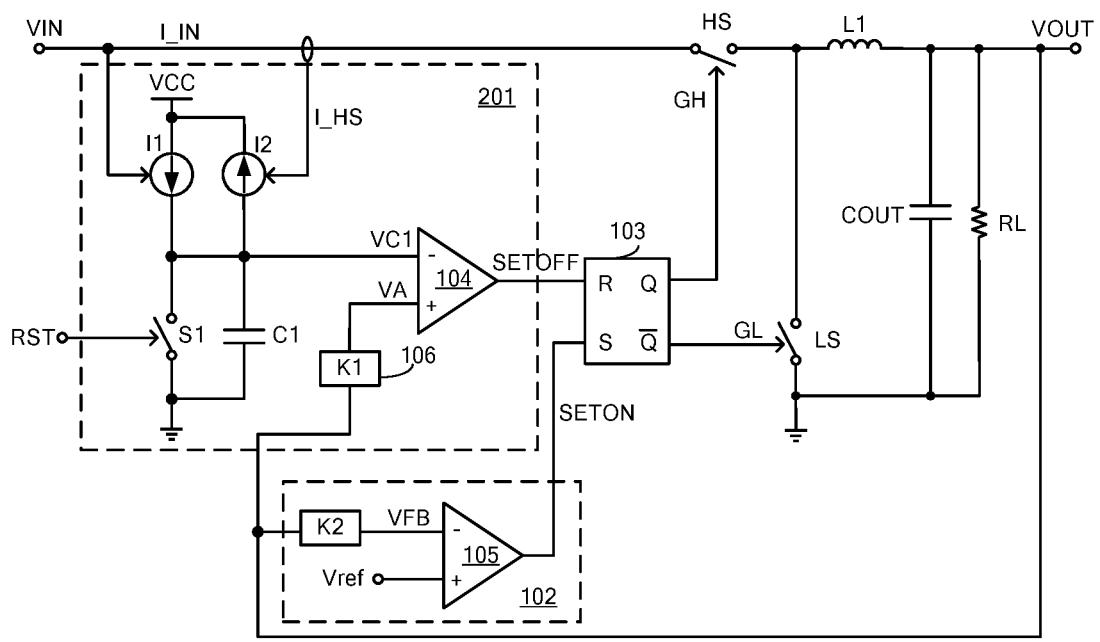
FIG. 2 schematically shows a voltage converter 20 in accordance with an embodiment of the present invention.

FIG. 2 schematically shows a voltage converter 20 in accordance with an embodiment of the present invention. As shown in FIG. 2, the voltage converter 20 comprises: an off control circuit 201, having a first input terminal configured to receive the input voltage VIN, a second input terminal configured to receive the output voltage VOUT, a third input terminal configured to receive a current representing signal I_HS indicative of a current flowing through the high side power switch HS, a fourth input terminal configured to receive the on-set signal RST corresponding to the on operation of the high side power switch HS, and an output terminal configured to provide the off control signal SETOFF to indicate an end of the on time period Ton of the high side power switch HS; wherein the on time period Ton of the high side power switch HS is regulated by the input voltage VIN, the output voltage VOUT and the current representing signal I_HS.

In the embodiment of FIG. 2, the off control circuit 201 comprises: the first current source I1, providing the first current controlled by the input voltage VIN; the switch S1, coupled in series to the first current source I1, wherein the switch S1 is controlled to be on and off by the on-set signal RST; a second current source I2, coupled in parallel to the first current source I1, providing a second current controlled by an input current I_IN providing to the voltage converter 20; the capacitor C1, coupled in parallel to the switch S1, wherein the capacitor C1 is charged by a current having a magnitude determined by a difference of the first current and the second current; and the comparator 104, having a first input terminal configured to receive the voltage VC1 across the capacitor C1, a second input terminal configured to receive the off reference signal VREF_OFF having a magnitude proportional to the output voltage VOUT, and an output terminal configured to provide the off control signal SETOFF based on a comparison result of the voltage VC1 across the capacitor C1 and the off reference signal VREF_OFF. In one embodiment, the on-set signal RST has the same phase with the high side switching signal GH. It should be understood that any signal turns on the switch S1 when the high side power switch HS is turned on, and turns off the switch S1 when the high side power switch HS is turned off could be adopted as the on-set signal RST.

Figure 3:
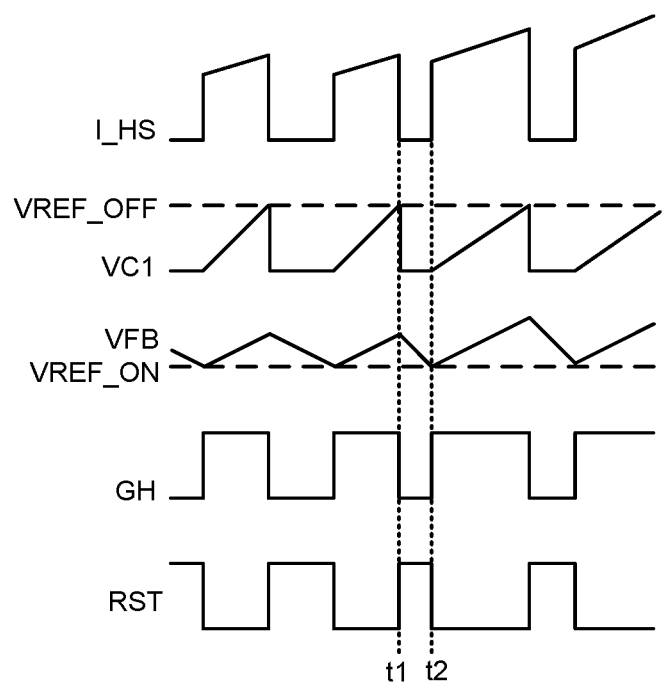
FIG. 3 shows waveforms of the current representing signal I_HS, the off reference signal VREF_OFF, the voltage VC1 across the capacitor C1, the feedback voltage VFB, the on reference signal VREF_ON, the high side switching signal GH, and the on-set signal RST during a low to high load transient of the voltage converter 20 in accordance with an embodiment of the present invention.

FIG. 3 shows waveforms of the current representing signal I_HS, the off reference signal VREF_OFF, the voltage VC1 across the capacitor C1, the feedback voltage VFB, the on reference signal VREF_ON, the high side switching signal GH, and the on-set signal RST during a low to high load transient of the voltage converter 20 in accordance with an embodiment of the present invention. In the embodiment of FIG. 2, the current representing signal I_HS, also referred to as a high side power switch current, comprises the input current I_IN. As shown in FIG. 3, when the load current increases around time t1, the off time period Toff is reduced by the control loop. The reduced off time period Toff results in an insufficient discharge of the inductor L1, which causes a higher starting point of the current I_L1 flowing through the inductor L1, i.e., the starting point of the current representing signal I_HS is higher when the high side power switch HS is on at time t2. That is to say, the current representing signal I_HS increases when the load steps up. The second current provided by the second current source I2 is controlled by the current representing signal I_HS, and increases as the current representing signal I_HS increases. In the embodiment of FIG. 2, the current charging the capacitor C1 is the difference of the first current and the second current, i.e., I1-I2. When the second current increases, the current I1-I2 decreases, making the charging process longer, which means the on time period Ton is prolonged and the power provided to the load increases. by this way, the voltage converter 20 responses faster to the load increase.

Figure 4:
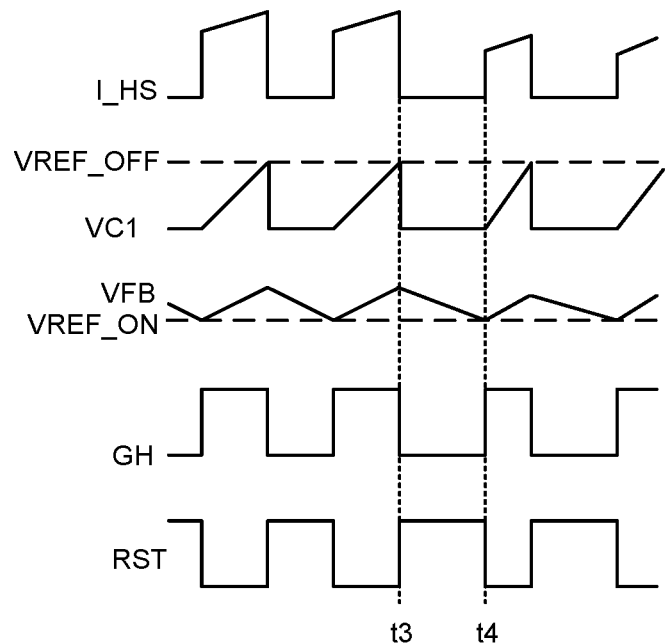
FIG. 4 shows waveforms of the current representing signal I_HS, the off reference signal VREF_OFF, the voltage VC1 across the capacitor C1, the feedback voltage VFB, the on reference signal VREF_ON, the high side switching signal GH, and the on-set signal RST during a high to low load transient of the voltage converter 20 in accordance with an embodiment of the present invention.

FIG. 4 shows waveforms of the current representing signal I_HS, the off reference signal VREF_OFF, the voltage VC1 across the capacitor C1, the feedback voltage VFB, the on reference signal VREF_ON, the high side switching signal GH, and the on-set signal RST during a high to low load transient of the voltage converter 20 in accordance with an embodiment of the present invention. As shown in FIG. 4, when the load current decreases around time t3, the off time period Toff is increased by the control loop. The increased off time period Toff results in a lower starting point of the current I_L1 flowing through the inductor L1, i.e., the starting point of the current representing signal I_HS is lower when the high side power switch HS is on at time t4. That is to say, the current representing signal I_HS decreases when the load steps up. The second current provided by the second current source I2 is controlled by the current representing signal I_HS, and decreases as the current representing signal I_HS decreases. When the second current decreases, the current I1-I2 increases, making the charging process shorter, which means the on time period Ton is shortened and the power provided to the load decreases. By this way, the voltage converter 20 responses faster to the load decrease.

In the embodiment of FIG. 2, the on time period Ton is adjusted by the current I_HS flowing through the high side power switch HS cycle by cycle. When the load current steps up, the control loop of the voltage regulator 20 reduces the off time period Toff of the high side power switch HS for each cycle and the high side power switch current I_HS increases. Then, the on time period Ton is prolonged following the high side power switch current I_HS. With longer on time period Ton, the ramping speed of the inductor current I_L1 is faster. Thus, the system moves to a new steady state more quickly. On the contrary, when the load current steps down, the control loop of the voltage converter 20 increases the off time period Toff of the high side power switch HS, and the high side power switch current I_HS decreases. Meanwhile, the on time period Ton is shortened to follow the high side power switch current I_HS. The reduction of on time period Ton fastens the system to achieve new operation point.

Compared with the prior art, the present invention increases the on time period during the low to high load transient and under heavy load condition. Thus the switching frequency of the voltage converter 20 under heavy load condition is relatively lower than that of the prior art voltage converter 10. As a result, the switching loss is reduced. Meanwhile, the adjustment of the on time period Ton speeds up the load transient, and lowers the need for high gain control loop of the voltage converter, which increases the system stability.

The input current I_IN equals the high side power switch current I_HS. In the embodiment of FIG. 2, the high side power switch current I_HS is obtained by sensing the input current I_IN.

The relationship between the high side power switch current I_HS and the second current provided by the second current source I2 could be determined according to the requirement of the detail application. In one embodiment, the current provided by the first current source I1 is 100 uA, and the current provided by the second current source I2 is 50 uA during heavy load, and is 20 uA during light load.

The present invention uses the voltage regulators with a typical BUCK topology, with the high side power switch HS and the low side power switch LS coupled between the input voltage VIN and the ground reference GND, and the inductor L1 coupled between a connection node of the power switches HS, LS and the output voltage VOUT, as examples for illustration. It should be known that the present invention is applicable to constant-on-time controlled voltage converters with other topologies too, e.g., BOOST, BUCK-BOOST, FLYBACK.

Figure 5:
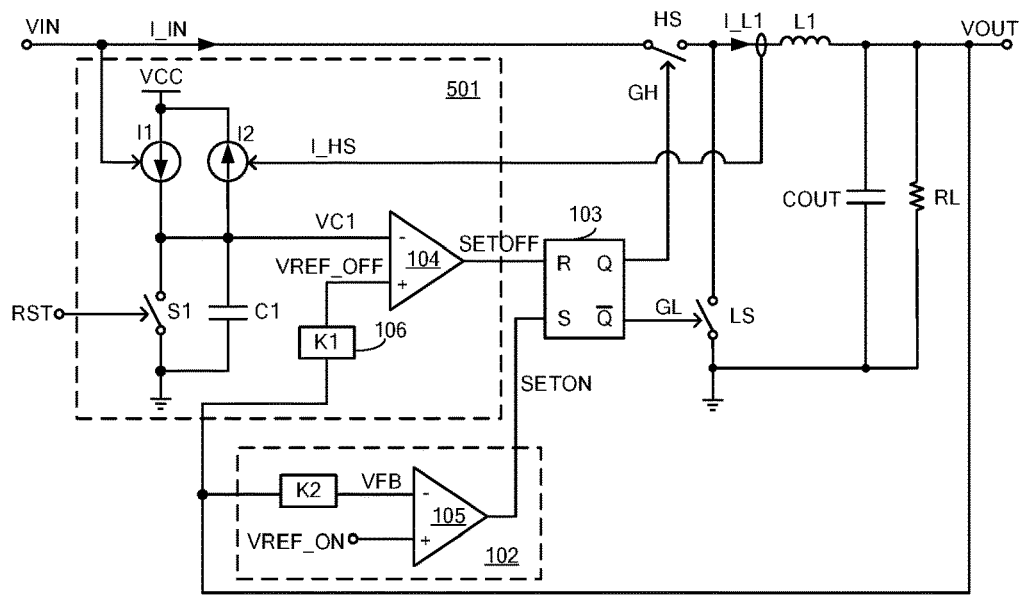
FIG. 5 schematically shows a voltage converter 50 in accordance with an embodiment of the present invention.

FIG. 5 schematically shows a voltage converter 50 in accordance with an embodiment of the present invention. The voltage converter 50 has the similar structure with the voltage converter 20 in FIG. 2, except for that the high side power switch current I_HS is obtained by sensing the current flowing through the inductor L1. Persons of ordinary skill in the art should know that the current flowing through the high side power switch HS equals the current flowing through the inductor L1 when the high side power switch HS is on. As can be seen from FIG. 5, the on time period Ton is determined during when the high side power switch HS is on. Thus, the current I_L1 works as the same as the high side power switch current I_HS.

Figure 6:
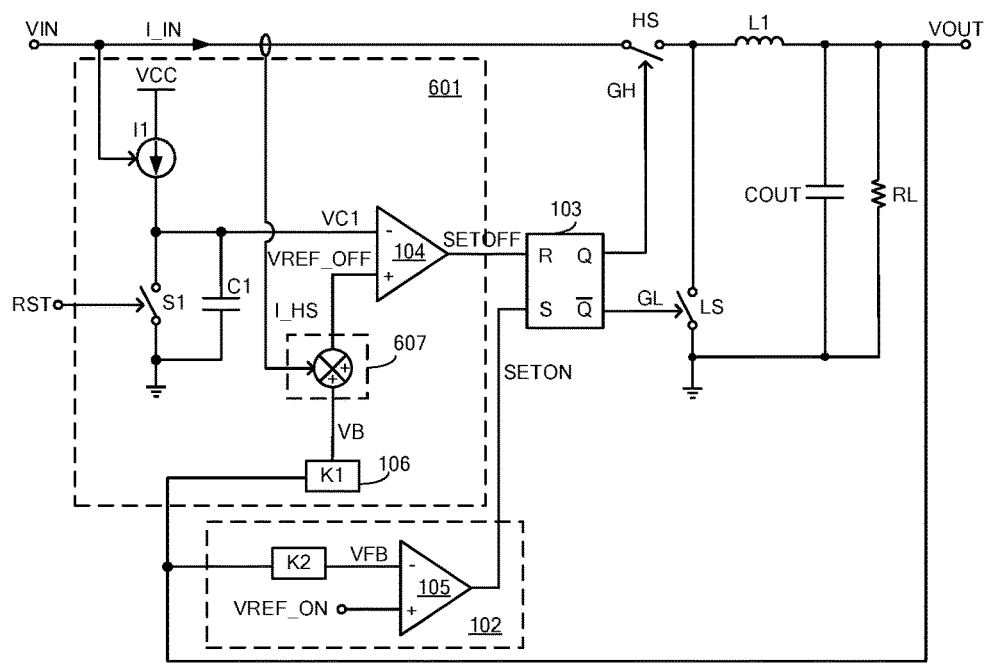
FIG. 6 schematically shows a voltage converter 60 in accordance with an embodiment of the present invention.

FIG. 6 schematically shows a voltage converter 60 in accordance with an embodiment of the present invention. The voltage converter 60 has the similar structure with the voltage converter 20 in FIG. 2 except for the off control circuit 601. As shown in FIG. 6, the off control circuit 601 comprises: the first current source I1, providing a first current controlled by the input voltage VIN; the switch S1, coupled in series to the first current source I1, wherein the switch S1 is controlled to be on and off by the on-set signal RST; the capacitor C1, coupled in parallel to the switch S1, wherein the capacitor C1 is charged by the first current; and the comparator 104, having the first input terminal configured to receive the voltage VC1 across the capacitor C1, the second input terminal configured to receive the off reference signal VREF_OFF having a magnitude determined by the output voltage VOUT and an input current I_IN providing to the voltage converter 60, and an output terminal configured to provide the off control signal SETOFF based on a comparison result of the capacitor voltage VC1 and the off reference signal VREF_OFF.

The off control circuit 601 further comprises a weighting circuit 607, configured to receive the input current I_IN and an output voltage representing signal VB, and to provide the off reference signal VREF_OFF based on the input current I_IN and the output voltage representing signal VB. The output voltage representing signal VB has a relationship VB=K4*VOUT, with the output voltage VOUT, wherein K4 is a scale factor between VB and VOUT. The weighting circuit 607 may comprise a current to voltage converting circuit to convert the input current I_IN to a voltage signal, and then add the converted voltage signal to the output voltage representing signal VB to generate the off reference signal VREF_OFF. In some embodiments, the weighting circuit 607 may comprise a voltage to current converting circuit to convert the output voltage representing signal VB to a current signal, add the converted current signal to the input current I_IN, and then convert the sum of the currents to the off reference signal VREF_OFF. In the present invention, any circuit that could provide the off time reference signal VREF_OFF with components of the input current I_IN and the output voltage representing signal VB could be used as the weighting circuit 607.

The operation of the voltage converter 60 is illustrated with reference to FIGS. 3, 4, and 6. In the embodiment of FIG. 6, the input current I_IN is weighted to the off time reference signal VREF_OFF. When the load current increases around time t1 in FIG. 3, the off time period Toff is reduced by the control loop and the current representing signal I_HS, i.e., the input current I_IN, increases as provided before. Then the off reference signal VREF_OFF increases. As a result, the time period for the voltage VC1 to be charged to the off reference signal VREF_OFF increases, which means the on time period Ton is prolonged and the power provided to the load increases. When the load current decreases around time t3 in FIG. 3, the off time period Toff is increased by the control loop and the current representing signal I_HS, i.e., the input current I_IN, decreases as provided before. Then the off reference signal VREF_OFF decreases. As a result, the time period for the voltage VC1 to be charged to the off reference signal VREF_OFF decreases, which means the on time period Ton is shortened and the power provided to the load decreases.

The operation of the voltage converter 60 is similar with that of the voltage converter 20, and is not described for brevity.

FIG. 7 schematically shows a voltage converter 70 in accordance with an embodiment of the present invention. The voltage converter 70 has the similar structure with the voltage converter 60 in FIG. 6, except for that the high side power switch current I_HS is obtained by sensing the current I_L1 flowing through the inductor L1. As provided before, both of the inductor current I_L1 and the input current I_IN could represent the high side power switch current I_HS in the present invention.

FIG. 8 shows a flowchart of a control method 80 of a constant-on-time controlled voltage converter in accordance with an embodiment of the present invention, wherein the constant-on-time controlled voltage converter has at least a high side power switch. As shown in FIG. 8, the control method 80 comprises: step 801, providing an on control signal to turn on the high side power switch, wherein the on control signal turns on the high side power switch when a feedback voltage indicative of an output voltage of the voltage converter decreases to an on reference signal; and step 802, providing an off control signal to turn off the high side power switch, wherein the off control signal turns off the high side power switch when an on time period of the high side power switch ends, and wherein the on time period is regulated by an input voltage of the voltage converter, the output voltage and a current representing signal indicative of a current flowing through the high side power switch.

In one embodiment, the current representing signal comprises an input current providing to the voltage converter.

In one embodiment, the current representing signal comprises an inductor current flowing through an inductor of the voltage converter.

In one embodiment, the on time period is determined by a time that a voltage across a capacitor increases from a lower reference signal to an off reference signal, wherein the capacitor is charged by a current controlled by the input voltage of the voltage converter, and the current representing signal, and wherein the charging process starts from when the high side power switch is turned on, and wherein the off reference signal is proportional to the output voltage of the voltage converter. In one embodiment, the current controlled by the input voltage and the current representing signal comprises a current difference of a first current with a magnitude proportional to the input voltage and a second current with a magnitude proportional to the current representing signal.

In one embodiment, the on time period is determined by a time period that a voltage across a capacitor increases from a lower reference signal to an off reference signal, wherein the capacitor is charged by a current controlled by the input voltage of the voltage converter, and wherein the off reference signal comprises a voltage sum of a first voltage with a magnitude proportional to the output voltage of the voltage converter, and a second voltage controlled by the current representing signal.

In one embodiment, the lower reference signal comprises a ground reference.

Obviously many modifications and variations of the present invention are possible in light of the above teachings. It is therefore to be understood that within the scope of the appended claims the invention may be practiced otherwise than as specifically described. It should be understood, of course, that the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A voltage converter having a high side power switch, comprising:
an off control circuit, having a first input terminal configured to receive an input voltage, a second input terminal configured to receive an output voltage, a third input terminal configured to receive a current representing signal indicative of a current flowing through the high side power switch, a fourth input terminal configured to receive an on-set signal corresponding to an on operation of the high side power switch, and an output terminal configured to provide an off control signal to indicate an end of an on time period of the high side power switch; wherein
the on time period of the high side power switch is regulated by the input voltage, the output voltage and the current representing signal.

2. The voltage converter of claim 1, wherein the off control circuit further comprising:
a first current source, providing a first current controlled by the input voltage;
a switch, coupled in series to the first current source, wherein the switch is controlled to be on and off by the on-set signal;
a second current source, coupled in parallel to the first current source, providing a second current controlled by an input current received by the voltage converter;
a capacitor, coupled in parallel to the switch, wherein the capacitor is charged by a current having a magnitude associating with a difference of the first current and the second current; and
a comparator, having a first input terminal configured to receive a voltage across the capacitor, a second input terminal configured to receive an output voltage representing signal having a magnitude proportional to the output voltage, and an output terminal configured to provide the off control signal based on a comparison result of the voltage across the capacitor and the output voltage representing signal.

3. The voltage converter of claim 1, wherein the off control circuit further comprising:
a first current source, providing a first current controlled by the input voltage;
a switch, coupled in series to the first current source, wherein the switch is controlled to be on and off by the on-set signal;
a second current source, coupled in parallel to the first current source, providing a second current controlled by an inductor current flowing through an inductor of the voltage converter;
a capacitor, coupled in parallel to the switch, wherein the capacitor is charged by a current having a magnitude associating with a difference of the first current and the second current; and
a comparator, having a first input terminal configured to receive a voltage across the capacitor, a second input terminal configured to receive an output voltage representing signal having a magnitude proportional to the output voltage, and an output terminal configured to provide the off control signal based on a comparison result of the voltage across the capacitor and the output voltage representing signal.

4. The voltage converter of claim 1, wherein the off control circuit further comprising:
a first current source, providing a first current controlled by the input voltage;
a switch, coupled in series to the first current source, wherein the switch is controlled to be on and off by the on-set signal;
a capacitor, coupled in parallel to the switch, wherein the capacitor is charged by the first current; and
a comparator, having a first input terminal configured to receive a voltage across the capacitor, a second input terminal configured to receive an output voltage representing signal having a magnitude associated with the output voltage and an input current received by the voltage converter, and an output terminal configured to provide the off control signal based on a comparison result of the voltage across the capacitor and the output voltage representing signal.

5. The voltage converter of claim 1, wherein the off control circuit further comprising:
a first current source, providing a first current controlled by the input voltage;
a switch, coupled in series to the first current source, wherein the switch is controlled to be on and off by the on-set signal;
a capacitor, coupled in parallel to the switch, wherein the capacitor is charged by the first current; and
a comparator, having a first input terminal configured to receive a voltage across the capacitor, a second input terminal configured to receive an output voltage representing signal having a magnitude associated with the output voltage and an inductor current flowing through an inductor of the voltage converter, and an output terminal configured to provide the off control signal based on a comparison result of the voltage across the capacitor and the output voltage representing signal.

6. The voltage converter of claim 1, further comprising:
an on control circuit, having a first input terminal configured to receive a feedback signal indicative of the output voltage, a second input terminal configured to receive an on reference signal, and an output terminal configured to provide an on control signal to indicate a start of the on time period of the high side power switch; and
a logic circuit, having a first input terminal configured to receive the off control signal, a second input terminal configured to receive the on control signal, and an output signal configured to provide a high side switching signal to control the high side power switch, wherein the high side power switch is turned on in response to the on control signal, and is turned off in response to the off control signal.

7. The voltage converter of claim 6, wherein the on control circuit further comprising:
a comparator, having a first input terminal configured to receive the feedback signal, a second input terminal configured to receive the on reference signal, and an output terminal configured to provide the on control signal based on a comparison result of the feedback signal and the on reference signal.

8. The voltage converter of claim 6, wherein the logic circuit further comprising:
a RS flip-flop, having a reset terminal configured to receive the off control signal, a set terminal configured to receive the on control signal, and an output terminal configured to provide the high side switching signal.

9. The voltage converter of claim 1, further comprising:
a low side power switch, coupled to the high side power switch, wherein the high side power switch and the low power switch are turned on and off alternately to convert the input voltage to the output voltage.

10. The voltage converter of claim 1, further comprising:
an inductor, having a first terminal coupled to the high side power switch, and a second terminal configured to provide the output voltage.

11. The voltage converter of claim 1, further comprising:
an inductor, having a first input terminal coupled to the high side power switch, and a second input terminal configured to receive the input voltage.

12. A voltage converter comprising:
a high side power switch;
a low side power switch coupled to the high side power switch, wherein the high side power switch and the low side power switch are turned on and off alternately to convert an input voltage to an output voltage; and
an off control circuit, having a first input terminal configured to receive the input voltage, a second input terminal configured to receive the output voltage, a third input terminal configured to receive a current representing signal indicative of a current flowing through the high side power switch, a fourth input terminal configured to receive an on-set signal corresponding to an on operation of the high side power switch, and an output terminal configured to provide an off control signal to indicate an end of an on time period of the high side power switch; wherein the on time period of the high side power switch is regulated by the input voltage, the output voltage and the current representing signal.

13. The voltage converter of claim 12, wherein the off control circuit further comprising:
   a first current source, providing a first current controlled by the input voltage;
   a switch, coupled in series to the first current source, wherein the switch is controlled to be on and off by the on-set signal;
   a second current source, coupled in parallel to the first current source, providing a second current controlled by an input current received by the voltage converter;
   a capacitor, coupled in parallel to the switch, wherein the capacitor is charged by a current having a magnitude associating with a difference of the first current and the second current; and
   a comparator, having a first input terminal configured to receive a voltage across the capacitor, a second input terminal configured to receive an output voltage representing signal having a magnitude proportional to the output voltage, and an output terminal configured to provide the off control signal based on a comparison result of the voltage across the capacitor and the output voltage representing signal.

14. The voltage converter of claim 12, wherein the off control circuit further comprising:
   a first current source, providing a first current controlled by the input voltage;
   a switch, coupled in series to the first current source, wherein the switch is controlled to be on and off by the on-set signal;
   a second current source, coupled in parallel to the first current source, providing a second current controlled by an inductor current flowing through an inductor of the voltage converter;
   a capacitor, coupled in parallel to the switch, wherein the capacitor is charged by a current having a magnitude associating with a difference of the first current and the second current; and
   a comparator, having a first input terminal configured to receive a voltage across the capacitor, a second input terminal configured to receive an output voltage representing signal having a magnitude proportional to the output voltage, and an output terminal configured to provide the off control signal based on a comparison result of the voltage across the capacitor and the output voltage representing signal.

15. The voltage converter of claim 12, wherein the off control circuit further comprising:
   a first current source, providing a first current controlled by the input voltage;
   a switch, coupled in series to the first current source, wherein the switch is controlled to be on and off by the on-set signal;
   a capacitor, coupled in parallel to the switch, wherein the capacitor is charged by the first current; and
   a comparator, having a first input terminal configured to receive a voltage across the capacitor, a second input terminal configured to receive an output voltage representing signal having a magnitude associated with the output voltage and an input current received by the voltage converter, and an output terminal configured to provide the off control signal based on a comparison result of the voltage across the capacitor and the output voltage representing signal.

16. The voltage converter of claim 12, wherein the off control circuit further comprising:
   a first current source, providing a first current controlled by the input voltage;
   a switch, coupled in series to the first current source, wherein the switch is controlled to be on and off by the on-set signal;
   a capacitor, coupled in parallel to the switch, wherein the capacitor is charged by the first current; and
   a comparator, having a first input terminal configured to receive a voltage across the capacitor, a second input terminal configured to receive an output voltage representing signal having a magnitude associated with the output voltage and an inductor current flowing through an inductor of the voltage converter, and an output terminal configured to provide the off control signal based on a comparison result of the voltage across the capacitor and the output voltage representing signal.

17. The voltage converter of claim 12, further comprising:
   an on control circuit, having a first input terminal configured to receive a feedback signal indicative of the output voltage, a second input terminal configured to receive an on reference signal, and an output terminal configured to provide an on control signal to indicate a start of the on time period of the high side power switch; and
   a logic circuit, having a first input terminal configured to receive the off control signal, a second input terminal configured to receive the on control signal, and an output signal configured to provide a high side switching signal to control the high side power switch, wherein the high side power switch is turned on in response to the on control signal, and is turned off in response to the off control signal.

18. A control method for a voltage converter having a high side power switch, comprising:
   providing an on control signal to turn on the high side power switch, wherein the on control signal turns on the high side power switch when a feedback voltage indicative of the output voltage decreases to an on reference signal; and
   providing an off control signal to turn off the high side power switch, wherein the off control signal turns off the high side power switch when an on time period of the high side power switch ends, and wherein the on time period is regulated by the input voltage, the output voltage and a current representing signal indicative of a current flowing through the high side power switch.

19. The control method of claim 18, wherein the current representing signal comprises an input current received by the voltage converter.

20. The control method of claim 18, wherein the current representing signal comprises an inductor current flowing through an inductor of the voltage converter.

* * * * *